US008406399B2

(12) United States Patent
Loveland

(10) Patent No.: US 8,406,399 B2
(45) Date of Patent: Mar. 26, 2013

(54) DISTRIBUTED CONFERENCE BRIDGE AND VOICE AUTHENTICATION FOR ACCESS TO NETWORKED COMPUTER RESOURCES

(75) Inventor: Shawn D Loveland, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1310 days.

(21) Appl. No.: 12/144,626

(22) Filed: Jun. 24, 2008

(65) Prior Publication Data

US 2008/0253549 A1    Oct. 16, 2008

Related U.S. Application Data

(63) Continuation of application No. 10/875,914, filed on Jun. 24, 2004, now abandoned.

(51) Int. Cl.
*H04M 3/42* (2006.01)
*H04M 1/00* (2006.01)

(52) U.S. Cl. .................... 379/201.01; 379/158
(58) Field of Classification Search ............... 379/158, 379/202.01, 266.07
See application file for complete search history.

(56) References Cited

U.S. PATENT DOCUMENTS

| | | | | |
|---|---|---|---|---|
| 5,500,919 A | | 3/1996 | Luther | 704/260 |
| 5,563,882 A | * | 10/1996 | Bruno et al. | 370/260 |
| 5,873,068 A | | 2/1999 | Beaumont et al. | 705/14 |
| 5,873,108 A | | 2/1999 | Goyal et al. | |
| 5,889,516 A | | 3/1999 | Hickey et al. | |
| 6,058,415 A | | 5/2000 | Polcyn | 709/200 |
| 6,081,513 A | * | 6/2000 | Roy | 370/260 |
| 6,108,696 A | | 8/2000 | Mendhekar et al. | |
| 6,154,465 A | | 11/2000 | Pickett | 370/466 |
| 6,259,449 B1 | | 7/2001 | Saxena et al. | 715/853 |
| 6,351,771 B1 | | 2/2002 | Craddock et al. | 709/227 |
| 6,381,321 B1 | * | 4/2002 | Brown et al. | 379/207.02 |
| 6,456,973 B1 | | 9/2002 | Fado et al. | 704/260 |
| 6,477,374 B1 | | 11/2002 | Shaffer et al. | |
| 6,499,021 B1 | | 12/2002 | Abu-Hakima | 706/10 |
| 6,650,739 B1 | | 11/2003 | Doeberl et al. | 379/88.18 |
| 6,658,095 B1 | | 12/2003 | Yoakum et al. | 379/93.01 |
| 6,671,262 B1 | * | 12/2003 | Kung et al. | 370/260 |
| 7,003,086 B1 | * | 2/2006 | Shaffer et al. | 379/202.01 |
| 7,177,908 B1 | | 2/2007 | Chang et al. | 709/206 |
| 2001/0018718 A1 | | 8/2001 | Ludtke et al. | 709/321 |
| 2003/0105821 A1 | | 6/2003 | Shah et al. | 709/206 |
| 2005/0008003 A1 | | 1/2005 | Ramey et al. | 370/352 |
| 2005/0128102 A1 | | 6/2005 | Obradovich et al. | 340/905 |
| 2005/0267935 A1 | | 12/2005 | Gandhi et al. | 709/203 |
| 2006/0031364 A1 | | 2/2006 | Hamilton et al. | 709/206 |

OTHER PUBLICATIONS

General Magic Corporate Site. *PORTICO: Portico Features and Overview*. [web page] 1999; http://www.generalmagic.com/portico/portico_overview.shtml. [Accessed Oct. 5, 1999].
General Magic. *PORTICO: Frequently Asked Questions*. [web page] 1999; http://www.generalmagic.com/portico/portico_faq.shtml. [Accessed Oct. 5, 1999].

(Continued)

*Primary Examiner* — Rasha Al Aubaidi

(57) ABSTRACT

A system is disclosed for enabling communication between server resources and a wide spectrum of end-terminals to enable users access to the resources of both converged and non-converged networks via voice and/or electronically generated commands. An electronic personal assistant (ePA) incorporates generalizing/abstracting communications channels, data and resources provided through a converged computer/telephony system interface such that the data and resources are readily accessed by a variety of interface formats including a voice interface or data interface. A set of applications provide dual interfaces for rendering services and data based upon the manner in which a user accesses the data. An electronic personal assistant in accordance with an embodiment of the invention provides voice/data access to web pages, email, file shares, etc.

14 Claims, 9 Drawing Sheets

OTHER PUBLICATIONS

General Magic Corporate Site. PORTICO: Portico Features and Overview, [web page] 1999; http://www.eeneralmaEic.com/Dortico/portico overview.shtml. [Accessed Oct. 5, 1999].

General Magic. PORTICO: Frequently Asked Questions, [web page] 1999; http://www.eeneralmaeic.com/portico/portico faq.shtml. [Accessed Oct. 5, 1999].

* cited by examiner

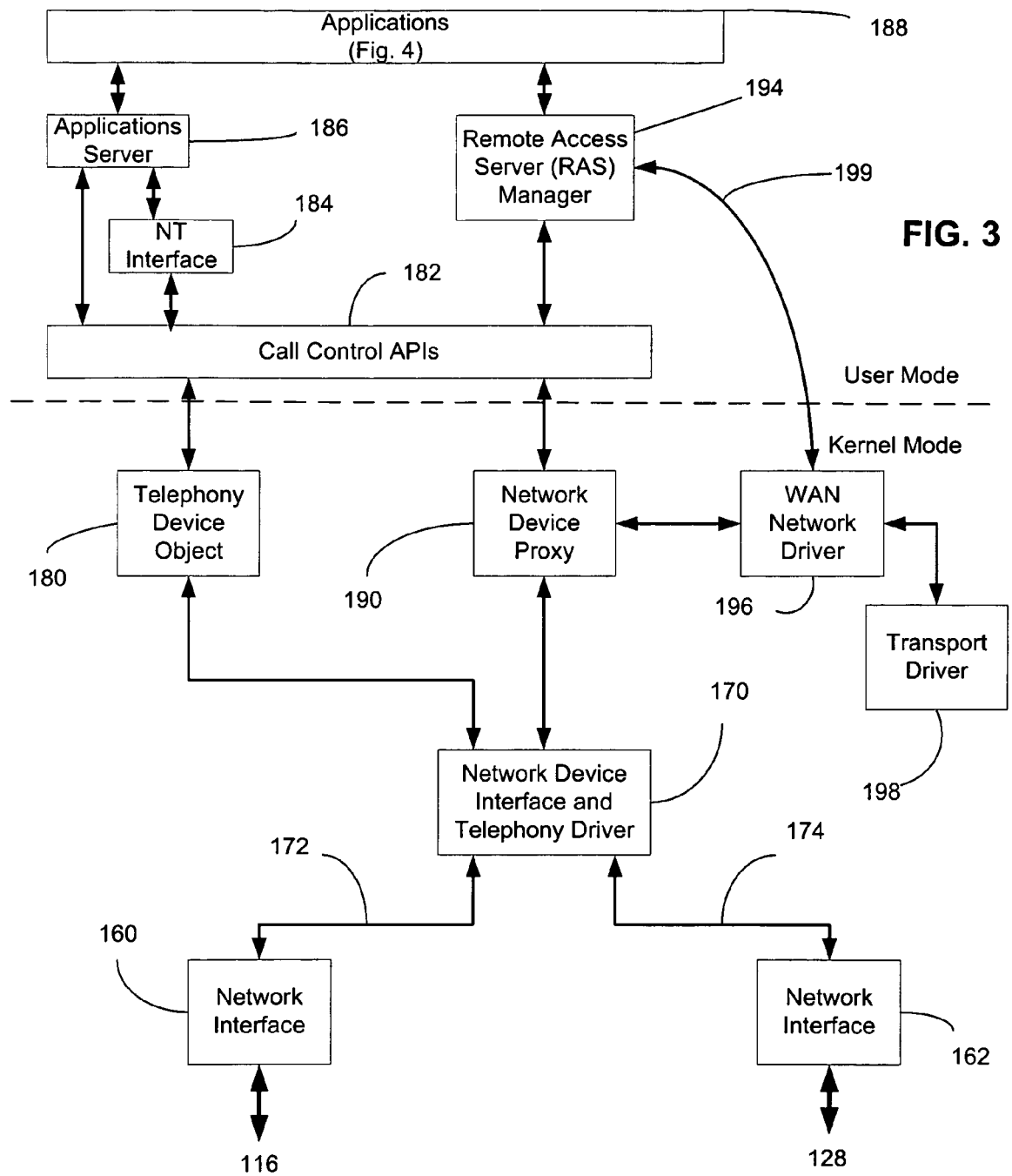
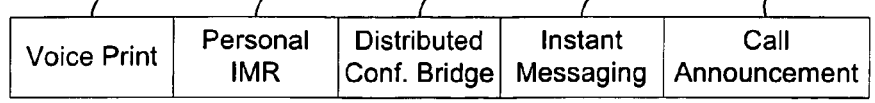

DISTRIBUTED CONFERENCE BRIDGE AND VOICE AUTHENTICATION FOR ACCESS TO NETWORKED COMPUTER RESOURCES

CROSS-REFERENCE TO RELATED PATENT APPLICATIONS

This patent application is a continuation of copending U.S. patent application Ser. No. 10/875,914, filed on Jun. 24, 2004, entitled "A MULTI-ACCESS MODE ELECTRONIC PERSONAL ASSISTANT."

AREA OF THE INVENTION

The present invention generally relates to the area of networks for providing telephony and data resources and more particularly to methods and mechanisms for providing access to networked resources via either voice or electronic data communications.

BACKGROUND OF THE INVENTION

The overwhelming majority of access to computer resources today from remote locations has been via remote electronic data communications. There are many forms of such access including for example modems or digital subscriber lines. Remote users communicate with, and access the resources of, a local system via a personal computer or computer appliance, such as for example a palm-sized scaled-down version of a personal computer.

Applications typically support connected computers having graphical user interfaces. However, similar interface functionality is not supported for end-devices having voice user interfaces. As a result, a user's access to the functionality of a particular application or resource is dictated by the manner in which the user accesses the computer system upon which the application or resource resides.

Businesses typically have two systems accessed remotely on a regular basis by their users. A local area network handles data communications, and a private branch exchange (PBX) system handles voice communications. The local area network provides access by users to file and computer applications/servers thereby enabling a user to carry out computer applications on a computer from a remote location. The PBX system enables users to retrieve and respond to voice messages left for the users on the PBX voice mail system. The PBX also enables a remote user to call multiple persons served by the PBX with a single call.

The businesses also include two separate and distinct sets of physical communications lines to their places of business. A first set of lines provide communication links between a public switched telephone network (PSTN) and a private branch exchange (PBX) system including phones and other telephony. A set of PSTN lines terminate at a business site at a PBX connected to a business' internal phone lines. A second set of lines provide links between external data networks and internal local area networks (LANs) for the businesses. Examples of such lines are T1, E1, ISDN, PRI, and BRI.

In recognition of the potential efficiencies arising from converging two physically and operationally distinct networks into a single network, the network technology industry has sought to define and implement a single, converged, network meeting the demands for all types of communications including voice, facsimile, data, etc. As a result, a new telephony/data transmission paradigm is emerging. The new paradigm is based upon a packet-based, switched, multi-media network. Data and voice, while treated differently at the endpoints by distinct applications, share a common transport mechanism.

Convergence presents the opportunity for the creation of applications including communication interfaces that not only support computer-generated commands, but also voice commands from a remote user. It also presents the opportunity to enhance the variety and flexibility of uses for PBX systems.

One aspect of computer systems accessed remotely via voice commands is the implementation of security measures. Voice interfaces present the opportunity for users to connect to a network from virtually any location. Presently, security mechanisms for restricted access systems accessed via telephone typically rely upon users to enter a number on a touch-tone phone to limit access. However, this method is highly susceptible to eavesdropping. Also, the users are often required to enter a long sequence of numbers that can easily be forgotten. A voice-controlled computer system will require speech recognition functionality. Speech recognition programs and associated "training" databases (used to train the software to recognize voice commands from a user) do not guarantee that another user's speech will not invoke protected operations on the computer system. Thus, if the computer system is to be secure, then additional speaker recognition/authentication procedures must be included in the system.

The use of speaker recognition/authentication processes to protect resources in a computer system is known. Such systems have weaknesses that enable imposters to gain access to the computer system. The simplest voice authentication scheme requires a user to speak a password, and the authentication system verifies the user by comparing the spoken password to an existing copy of the password. An obvious weakness to this authentication procedure is that the security system cannot distinguish between whether the user is the source of the vocalized password or it is merely an electronically recorded copy of the user's voice.

One solution to the well known "electronically-recorded" password scheme is to request the user to utter the password multiple times. The multiple utterances, in addition to being compared to the digitally stored vocal password at the computer system site, are compared to one another to ensure that the utterances are sufficiently different from one another to ensure that a recording of the password is not being replayed multiple times by an imposter seeking to gain remote access to protected computer resources. Of course, the imposter can circumvent this safeguard by making multiple recordings of the password spoken multiple times by an authorized user. Furthermore, copies of a single original spoken password can be altered and then stored to create variations from the original.

What is needed is a speaker authentication scheme wherein imposters cannot use a recording of the user's voice to render a valid passwords to gain access to protected computer resources. There exist a number of systems that attempt to overcome the shortcomings of voice-based authentication schemes. Such authentication mechanisms include smart cards, secure ID's, and retina scanners. However, these mechanisms require special hardware at the site from which a user calls.

In accordance with another aspect of a converged wide-area network interface to a computer system, there is an interest to exploit a system wherein telephony and digital data systems share programs and data. Voice-based computer access, described above, is one such effort to exploit converged technology. Once authenticated, a user may access computer resources via voice commands rather than issuing commands by means of a remote computer (e.g., a laptop computer). The user may access a number of applications integrated into the converged local network including databases, file servers, Interactive Voice Response (IVR) servers, call centers, voice mail, PBX hubs/endnodes, and conference bridges.

With regard to the last of the listed potential applications, it is noted that conference bridges are generally implemented today in two ways. One way is to purchase a Conference Bridge with certain capacity. It is then used as a fixed resource like a physical conference room. If a conference bridge has 24 ports it can support one 24-user conference call. It could also support three eight-port conference calls.

Extending the size of a conference via external conference bridging is a challenge to coordinators of a conference. A second conference phone number has to be forwarded to each of the participants who is to be bridged into the conference via the external bridge. Then the external conference bridge calls in to the internal conference bridge. Alternatively, callers could call a number that is received by the PBX handling the conference which in turn forwards the call to an external conference bridge. However, each forwarded call uses two trunks in the PBX system.

Another option is to subscribe to a conference bureau. A bureau is a service that supplies an external conference bridge (and number to call into the bridge). The bureau typically charges a customer based upon the number of users and the duration of the use of the bridge (e.g., per user-minute). External bridges allow for more dynamic meetings however the cost for utilizing external bridges on a regular basis is substantial.

SUMMARY OF THE INVENTION

The present invention seeks to exploit the convergence paradigm and/or the ability to communicate with a wide spectrum of end-terminals to enable users access to the resources of both converged and non-converged networks via voice and/or electronically generated commands. For example, an electronic personal assistant (ePA) incorporates generalizing/abstracting communications channels, data and resources provided through a converged computer/telephony system interface such that the data and resources are readily accessed by a variety of interface formats including a voice interface or data interface. A set of applications provide dual interfaces for rendering services and data based upon the manner in which a user accesses the data. An electronic personal assistant in accordance with an embodiment of the invention provides voice/data access to web pages, email, file shares, etc.

The electronic personal assistant enables a user to transmit voice commands to a voice-based resource server to provide information accessible to the resource server. In accordance with an aspect of an embodiment of the invention, a user is authenticated by receiving vocal responses by a user to one or more requests variably selected and issued by a speaker recognition-based authentication facility—thereby ensuring that every time a user logs into the network there is a unique challenge response to gain access to the network resources. A spoken response is compared to one or more stored voice samples previously provided by the user during an enrollment procedure. If the spoken response is sufficiently close to the one or more stored voice samples, then the user is authenticated as a domain user or logged onto the local system. The voice-based authentication facility enables a user to log in to a computer without the aid of a keyboard, smart card or such. This would work in a kiosk environment. Thereafter, an application proxy is created. The application proxy acts on behalf of the authenticated authorized user.

In accordance with particular aspects of the specific embodiments of the invention, a set of remotely accessed voice applications are provided. One such application comprises a personal interactive multimedia response (IMR). Each user configures a personal IMR system. In a converged network environment, the user is provided access to the IMR through a personal computer interface, web interface, instant message, e-mail, as well as a voice user interface over a telephone connection.

A configurable distributed conference bridge is another potential application incorporated within the converged network architecture model of the present invention. The distributed conference bridge enables local conference resources to be utilized and incorporates external service bureau conference bridge resources when needed to supplement the internal conference bridge resources of a system. This may or may not require any user intervention to create the bridged conference bridge. The dynamically configurable extensible conference bridge application supports standard voice conference calls, multimedia conference calls, and blended conference calls. As a consequence a customer need not provision in-house conference bridge resources, switch resources, or trunks for a worst case scenario and the conference bridge may be used on a more ad hock basis since it can dynamically grow to meet the demands of the conference.

In accordance with an aspect of a preferred embodiment of the conference bridge application, in addition to manual call set-up with regard to the overflow connections to the external bridge, the conference bridge application supports automatic redirecting head end conference phone numbers utilizing remote call forward, QSIG, PINT, and/or in-band signaling.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3 is a schematic drawing of an exemplary interface between a public and a private network for implementing an embodiment of the present invention;

FIG. 4 is a diagram identifying a set of voice-based applications supported on a private network in accordance with an embodiment of the present invention;

DETAILED DESCRIPTION OF A PREFERRED EMBODIMENT

Figure 1:
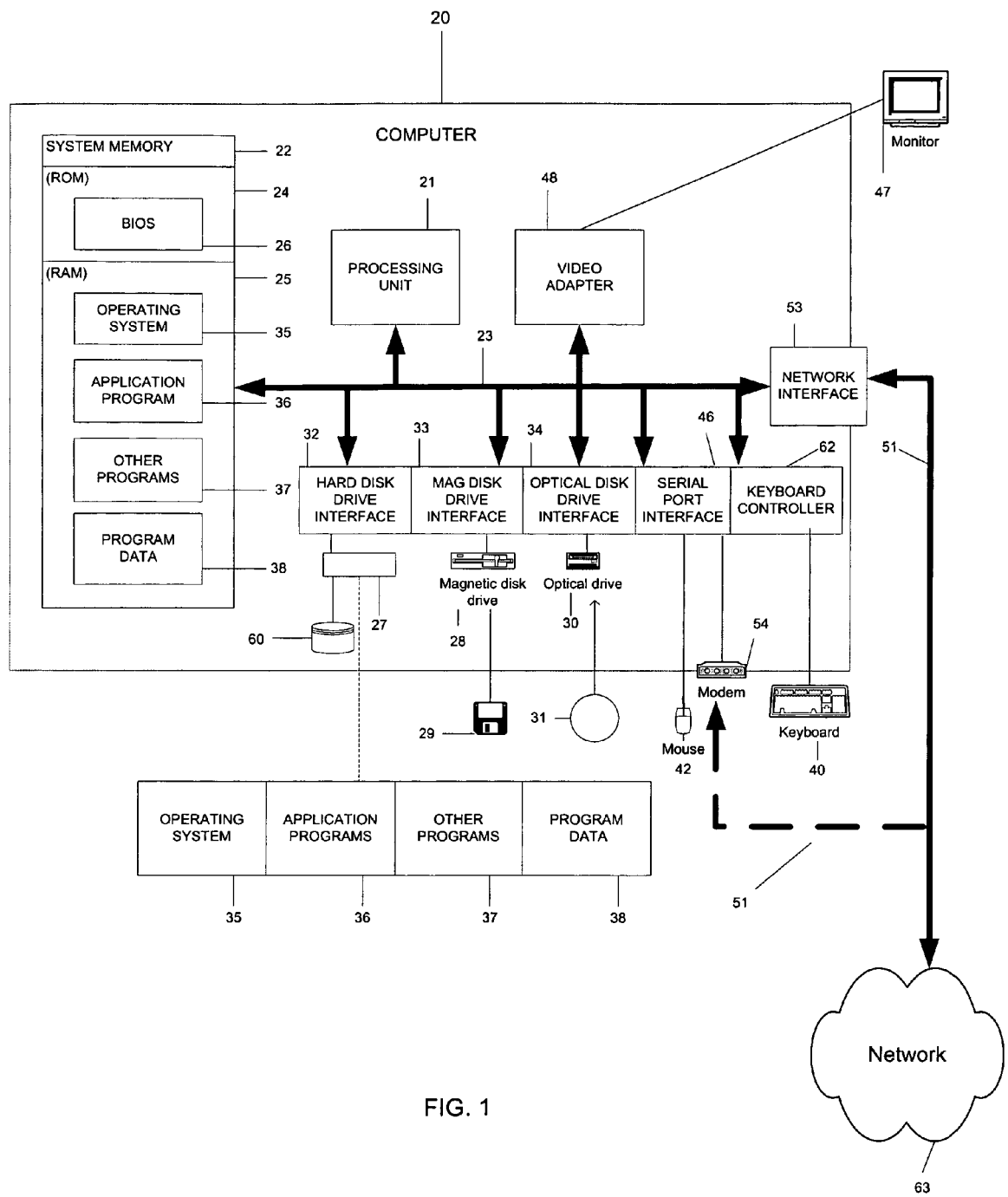
FIG. 1 is a block diagram schematically depicting an exemplary computer system for incorporating the terminal abstraction architecture and carrying out the electronic personal assistant and voice print operations in accordance with a preferred embodiment of the present invention.

Turning to the drawings, wherein like reference numerals refer to like elements, the invention is illustrated as being implemented in a suitable computing environment. Although not required, the invention will be described in the general context of computer-executable instructions, such as programs, being executed by a computer or similar device. Generally, programs include routines, other programs, objects, components, data structures, dynamic-linked libraries (DLLs), executable code, etc. that perform particular tasks or implement particular abstract data types. Moreover, those skilled in the art will appreciate that the term "computer" is not meant to limit the invention to personal computers, as the invention may be practiced on multi-processor systems, network devices, minicomputers, mainframe computers, computer appliances, and the like. The invention may also be practiced in distributed computing environments where tasks are performed by physically distinct processing devices that are communicatively linked. In a distributed computing environment, parts of a program may be located in both local and remote memory storage devices.

With reference to FIG. 1, an exemplary system for implementing the invention is shown. As best shown in FIG. 1, the system includes a general purpose computer in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory may include read only memory (ROM) 24 and random access memory (RAM) 25. A basic input/output system (BIOS) 26, containing the basic routines that help to transfer information between elements within the computer 20, such as during start-up, may be stored in the ROM 24. The computer 20 may further include a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

If included in the computer 20, the hard disk drive 27, magnetic disk drive 28, and optical disk drive 30 may be connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of programs may be stored on the hard disk 60, magnetic disk 29, optical disk 31, ROM 24 or RAM 25, including an operating system 35, one or more applications programs 36, other programs 37, and program data 38. A user may enter commands and information into the computer 20 through input devices such as a keyboard 40, which is typically connected to the computer 20 via a keyboard controller 62, and a pointing device, such as a mouse 42. Other input devices (not shown) may include a microphone, joystick, game pad, satellite dish, scanner, or the like. Input devices as well as peripheral devices may be connected to the processing unit 21 through a serial port interface 46 that is coupled to the system bus, a parallel port, game port, universal serial bus (USB), 1394 bus, or other interfaces. A monitor 47 or other type of display device is also connected to the system bus 23 via an interface, such as a video adapter 48. In addition to the monitor, computers typically include other devices not shown, such as speakers and printers.

The computer 20 operates in a networked environment using logical connections to one or more devices within a network 63, including by way of example personal computers, servers, routers, network PCs, a peer device or other common network node. These devices typically include many or all of the elements described above relative to the computer 20.

Figure 2:
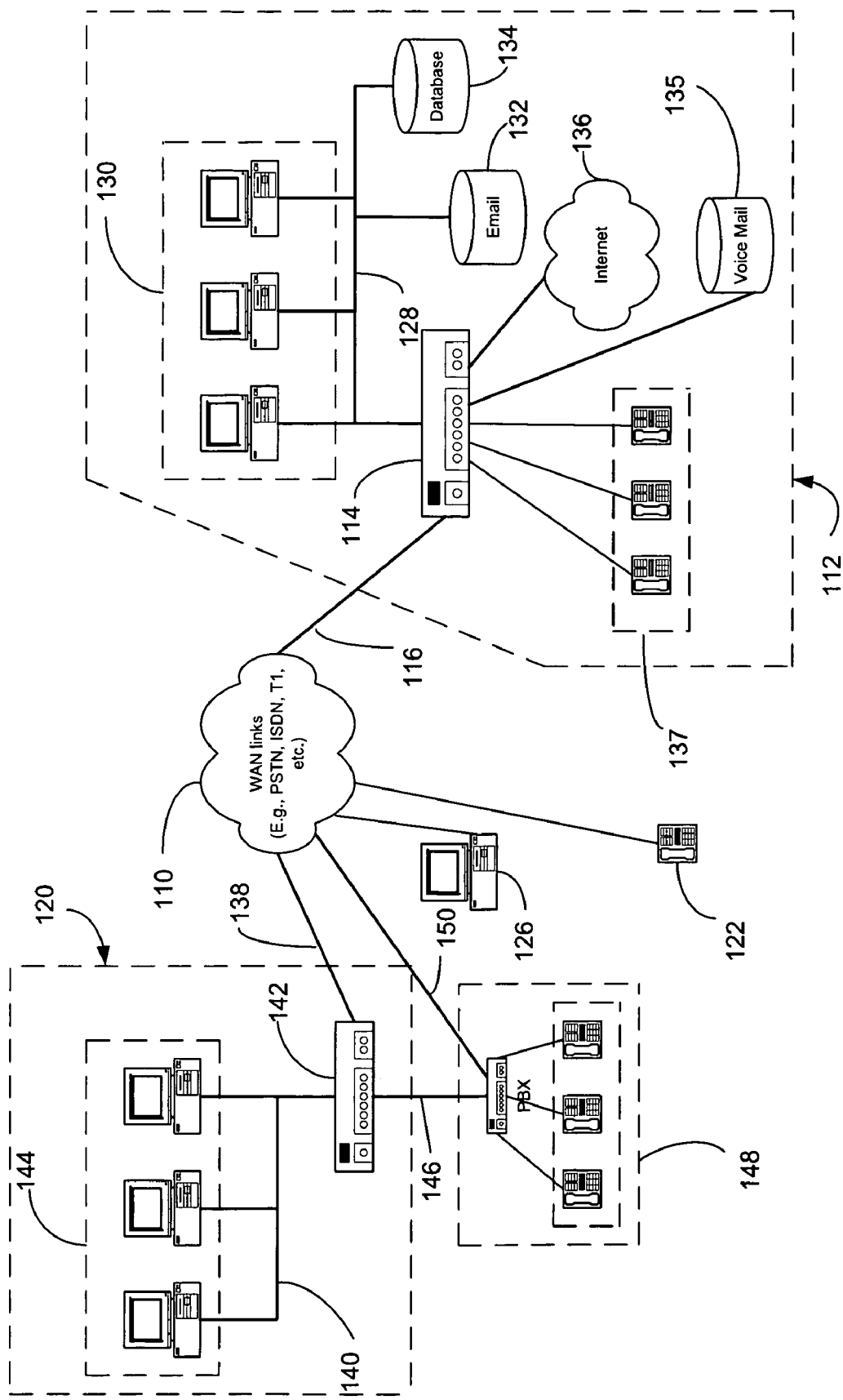
FIG. 2 is a schematic drawing depicting an exemplary network environment, including a converged network supporting both voice and data communications over a same network interface, into which the present invention may be incorporated.

The logical connections depicted in FIGS. 1 and 2 include one or more network links 51, for which there are many possible implementations, including local area network (LAN) links and wide area network (WAN) links. Such networking links are commonplace in offices, enterprise-wide computer networks, intranets and the Internet. It will be appreciated that the network connections shown are exemplary and other means of establishing a data path between the computers may be used. When used in a LAN, the computer 20 may be connected to the network 63 through a network interface or adapter 53. When used in a WAN, the computer 20 typically includes a modem 54 or other means for establishing communications over the network link 51, as shown by the dashed line in FIG. 1. The network link 51 may also be created over public networks, using technologies such as dial-up networking, the Internet, Digital Subscriber Line (DSL), Asynchronous Transfer Mode (ATM), Virtual Private Network (VPN) or any other conventional communication method. The modem 54 may be connected to the system bus 23 via the serial port interface 46, and may be external or internal. In a networked environment, programs depicted relative to the computer 20, or portions thereof, may be stored on other devices within the network 63.

In the description that follows, the invention will be described with reference to acts and symbolic representations of operations that are performed by one or more computers, unless indicated otherwise. As such, it will be understood that such acts and operations, which are at times referred to as being executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Turning now to FIG. 2, a schematic diagram depicts components of an exemplary communications network environment for incorporating an architecture wherein multiple types of user interfaces, including voice and graphical, are supported for individual applications and other computer resources residing on a networked system. Support for multiple types of user interfaces is provided by a terminal abstraction interposed between remote terminals having various user interfaces and individual applications and other computer resources on the networked system. The terminal abstraction, comprising a set of modules corresponding to user interface types, enables similar functionality to be provided by applications and resources to an extensible set of end-devices having differing user interfaces connected via a wide area network (WAN) 110 including by way of example any one or more of a set of linking networks such as a public switched telephone network (PSTN), integrated services data network (ISDN), T1, etc.

The converged computing/communications environment depicted in FIG. 2 includes a local network 112. In the local network 112, PSTN voice, IP voice, e-mail, instant messaging, video, fax, IP Fax, and data calls are blended together and passed through one routing/rules engine within a network interface/server 114. A converged communications link 116 connects the network interface/server 114 to the WAN 110. The converged communications link 116 supports both voice and data communications between the local network 112 and the WAN 110. While only a single link 116 is shown in FIG. 2 for the network interface/server 114, the network interface/server 114 also includes standard telephony interfaces which the network interface/server 114 utilizes to communicate over the PSTN via ordinary phone trunk lines.

The WAN 110 in turn provides wide area links to a variety of connected end-devices including, by way of example, a local area network 120, a public telephone 122, a facsimile machine, an Internet telephone 124, and a personal computer 126. The network interface/server 114 passes packets of information for voice phone conversations, voice mail, email, internet phone, video phone, fax, remote data access, remote service access, etc. In accordance with the connection processing architecture of the present invention, for a particular application, data and voice calls are directed to a terminal abstraction that communicates with the application according to an end-device independent format. Communications between the terminal abstraction and the application are not distinguished by the mode of access by an end-device to the application.

With regard to the local network 112, a link 128 connects the network interface/server 114 to an Ethernet link 128 of a local computer network including a set of computing devices 130. The computing devices 130 comprise, for example, personal computers, servers, client terminals and workstations. FIG. 2 explicitly shows two such servers, i.e., an email server 132 and a database server 134. The network interface/server 114 is also coupled to a voice mail system 135 and includes a link to the Internet 136. While not shown in FIG. 1, those skilled in the art will appreciate that the network interface/server 114 is physically coupled to links 116 and 128 via network interfaces including hardware and software adapted to transmit and receive data in accordance with the communications protocol for the associated links 116 and 128.

In accordance with the spectrum of communications supported by the network interface/server 114, the network interface/server 114 acts as a PBX hub and supports connections to a set of telephony equipment including telephones 137, facsimile machines, etc. via a variety of link types including, ordinary telephone lines, Ethernet, ATM, or even a wireless communication link. The network architecture of the local network 112 is merely exemplary. While the PBX functionality is built into the network server/interface 114 in the present example, a separate PBX hub may be located external to the network server/interface 114. The actual hardware configuration of a network or system embodying the present invention will be based upon choices of system hardware providers and the customers that utilize systems embodying the present invention. However, in accordance with an embodiment of the present invention, a terminal abstraction, a software entity, is interposed between an application and an end-terminal device that is communicating with the application.

The local area network 120, connected to the WAN 110 via link 138 includes network components similar to those of the first private network 112. Link 138 is connected to a computer network data interface/server 142. However, in contrast to the network interface/server 114, the link 138 between the WAN 110 and the computer network data interface/server 142 supports only data calls (i.e., voice telephone calls are not supported). However, while only a single link 138 is shown in FIG. 2 for the network interface/server 142, the network interface/server 142 may comprise multiple physical lines including multiple phone trunk lines to communicate over the PSTN.

An Ethernet link 140 connects the computer network data interface/server 142 to computing equipment 144. Computer network data interface/server 142 is connected via link 146 to telephony equipment 148 (including a PBX hub and telephones). Since the link 138 does not support voice calls, a trunk line 150 connects the PBX of the telephony equipment 148 to the public switched transmission network of the WAN 110. The PBX hub of the telephony equipment 148 includes functionality enabling applications within the local area network 120 to interface with voice-based end devices via link 146.

The links 116 and 138, in accordance with an embodiment of the present invention, are circuit switched. In other words, any particular connection supported by the links 116 and 138 is assigned a channel or channels (or a range of bandwidth) from a set of available channels (or bandwidth ranges). However, in alternative embodiments of the present invention, connections via links 118 and 138 are identified within transmitted packets rather than assigning a particular channel. Thus the local networks 112 and 120 may incorporate either circuit or packet switching.

FIG. 2 depicts an exemplary network configuration; however, those skilled in the art will readily appreciate from the disclosure herein that a multitude of network configurations incorporating the present invention are possible. In fact, convergence of data and voice communications expands the possibilities for potential networks that are not confined by the type of end devices (e.g., phone, computer, fax machine, instant messaging) connected to the network or even a same link on a network—such as both voice and data nodes on a single Ethernet link.

Text to speech (TTS) and speech to text (STT) converters play an important role in systems incorporating both voice and electronic (e.g., networked computer) modes of user access to applications incorporating the terminal abstraction architecture. User interaction, via audible commands and responses, with a variety of applications (e.g., databases) is rendered by TTS and STT converters within or coupled to the network interface/server 114. The TTS converter enables applications executing within the local area network 112 to transmit human understandable speech signals to a phone receiver used by a remote user thereby enabling the applications to communicate information to the remote users via audible sounds. The STT converter, employing speech recognition technology, enables a user to issue vocal commands and provide information by speaking commands into the receiver of a phone or through a voice command interface of a multimedia personal computer or a host-based server supporting various numbers of users simultaneously. The TTS and STT converters enable a user to communicate with the resources of the local area network 112 even if the user does not have a computer to receive and interpret a digitally encoded message. Alternatively, the user may submit commands via touch tone signals.

A network interface need not be converged to support both vocal and electronic data commands from a remote user. In an alternative embodiment, a network interface is non-converged and a user accesses resources within a data network via voice and/or touch-tone commands by means of the TTS converter and the STT converter. Finally, it is noted that a number of individually identified network entities depicted in FIG. 2 can be incorporated into a single hardware component. For example, a private branch exchange, database, and special purpose servers (e.g., email, voicemail, etc.) may be incorporated into the network interface/server 114 assuming that the processor could handle the aggregate processing load without degrading the expected level of performance of the network interface/server 114.

Furthermore, the system hardware and software can be owned and managed in a variety of manners. For example the entire system can be customer owned and managed, customer owned and managed by third parties, owned and managed by a third party offering IP Centrex services, or an ISP offering the service(s) in conjunction with an IP Centrex company.

Having described a general network environment within which the present invention may be deployed, attention is directed to FIG. 3 which schematically depicts functional components of an exemplary computer network data interface/server (i.e., communications server), such as network interface/server 114 embodying the present invention. The network interface/server 114 is physically coupled to links 116 and 128 via network interfaces 160 and 162. The hardware and software in network interfaces 160 and 162 conform to the protocols of corresponding links 116 and 128. The network interfaces 160 and 162 comprise multiple replicas of individual network cards to support multiple lines, such as telephone system trunk lines connecting the network interface/server 114 to the PSTN. Other interfaces, that have not been depicted in FIG. 2, support the connection of phone lines for the local phones 137 to the PBX system within the network interface/server 114.

Each of the network interfaces 160 and 162 is communicatively coupled, via software and/or hardware links 172 and 174 respectively, to a multipurpose driver 170 supporting both data and telephony connections. Data calls are calls that do not communicate via audible speech commands. Voice calls involve spoken commands and information. Data calls include, by way of example, Internet multimedia, video, Fax, IP telephony, e-mail, web forms, and web events. The multipurpose driver 170 utilizes unique identification information to distinguish between voice calls and data calls and route the calls accordingly to higher level programs and processes.

Voice call connection requests are routed by the multipurpose driver 170 to a telephony device object 180. The telephony device object 180 passes the requests to call control application program interfaces (APIs) 182. The call control APIs 182 pass the requests to higher level processes in the user level of the network interface/server 114 to perform application-specific operations. More particularly, the requests submitted via a voice call connection are passed by the call control APIs 182 to a voice call applications server 186. The voice call applications server 186 determines the nature of the request and invokes a particular application from a set of applications 188 registered with the voice applications server 186.

In accordance with a preferred embodiment of the present invention, one or more of the set of applications 188 support multiple modes of access via various terminal types. The support of multiple terminal types is facilitated by a terminal abstraction comprising interface models defining a variety of user interfaces for a variety of distinct modes of accessing corresponding applications. As a result, the applications are able to present their functionality (e.g., a schedule planner, email, a database, etc.) to connected users via a number of distinct modes of access. The different modes of access result from the use of unconventional end-terminal types (i.e., other than personal computers) to communicate with the applications and request the resources provided by the applications. Such unconventional end-terminal types include, by way of example, a cellular phone (including potentially a graphical or text interface), a palm-sized computer, computer appliance, and an ordinary telephone. In each instance a typical user interface cannot be supported by the end-terminal due to computational power limitations as well as, in some instances the absence of any visual display. Terminal abstraction modules are discussed in greater detail herein below with reference to FIG. 5, a schematic depiction of a particular example of an application (an interactive multimedia response system) that incorporates the terminal abstraction architecture for supporting multiple modes of access.

The terminal abstraction, conceptually an interface layer between functional components of an application and user terminals, can be either tightly integrated with a particular application or be provided as a generic/universal entity with a defined interface to which applications make calls during the course of execution of the applications. Thus, in certain embodiment of the present invention, the terminal abstractions are a part of specific applications. In other embodiments of the present invention, the terminal abstraction is at least partially carried out by system-level functions having standard interface definitions thereby significantly reducing the size and complexity of the applications that utilize them and thus reducing the programming effort involved in developing applications supporting multiple modes of access.

During the course of operation, the applications 188 pass requests to the voice applications server 186. The voice applications server 186 reformulates the request if necessary and passes the reformed request in the form of a system request to an NT Interface 184. The NT Interface 184 passes commands to the call control APIs 182 which pass the requests, in the form of system commands, to the WINDOWS NT operating system (or a suitable alternative operating system). Examples of system commands used to support the voice applications include lineAddProvider, lineClose, lineDrop, lineGetID, and lineMakeCall. Those skilled in the art will readily appreciate that a number of other general system commands can used to support execution of the voice applications 188 in view of the disclosure herein.

Both data calls and voice calls are initially routed to a network device proxy 190. At the commencement of a call, the network device proxy 190 routes the call to the call control APIs 182 including for example TAPI. Processes and tables within the call control APIs 182 in cooperation with a remote access service (RAS) manager 194 register the call, and in the case of data calls potentially create additional connections based upon the throughput requested for the data call and the availability of additional channels on the link 118.

After registering the call and allocating the proper number of channels to the call, control of the remainder of the call session is directed to application-specific processes. In the case of a voice call, the call is directed to the telephony device driver 180 that, in turn, directs the call to a particular application in the manner described previously above. In the case of a data call, the call is directed from the network device proxy 190 to a wide area network/network device interface 196. While in the data connection mode, the WAN/network device interface 196 calls a transport layer driver 198 and thereafter executes the call by direct calls to the RAS manager 194 via path 199. The RAS manager 194 in turn accesses the applications 188.

Turning now to FIG. 4, a set of voice applications are identified from the applications 188 generally identified in FIG. 3. The applications identified in FIG. 4, and others identified herein below, are provided collectively in the form of an electronic personal assistant that combines access to computer and telephony resources into a single extensible data and resource access system. In accordance with an embodiment of the present invention, one or more of the applications provide at least a graphical user interface facilitating user access via personal computers and a voice user interface for access to the resources of the electronic personal assistant via ordinary telephones. It is noted that the list of applications identified in FIG. 4 and recited herein is not exhaustive, and thus those skilled in the art will readily appreciate that additional applications may be added to, and even ones of the recited applications removed from, the electronic personal assistant without departing from the present invention.

A voice print application 200, a security mechanism, enables an authorized user to call into the network interface/server 114 (or in general a communications server) from any phone or other terminal device having a suitable voice signal transducer, including for example a personal computer having a microphone input, and be authenticated by properly responding to a set of authentication queries by the voice print application 200. The voice print application 200 utilizes a variable challenge/response scheme to confound imposters seeking to gain access using a recorded version of an authentic user's vocal response to a static query. The challenge/response scheme embodied within the voice print application 200, described herein below in conjunction with FIGS. 7 and 8, comprises variably issuing one or more queries, from a set containing multiple potential challenges, to an authorized user to obtain a voice sample for authentication of the user during logon.

Use of the voice print application 200 is not limited to remote calls. The voice print application 200 is intended for use at any terminal including a suitable voice transducer. Therefore, the voice print application 200 may also be used, by way of example to logon to a standalone computer or a local area network to gain access to restricted resources contained therein.

Users are preferably able to access the electronic personal assistant from a variety of end-terminal devices having different voice transducers, including ordinary telephones, cellular phones, wireless transmitters, and personal computer microphones. The potential to access the electronic personal assistant from a variety of terminals and connections of varying quality presents the need to ensure that a user's vocal logon attempt is not rejected merely because a different voice transducer or bad connection created differences between a training sequence and a query response. Preferably, sufficiently robust voice match procedures, known to those skilled in the art of voice-based user identity verification, are carried out during the comparison operation to reliably generate a positive match result when a proper user accesses the electronic personal assistant. Fail-safe authentication procedures for authentication provide fallback mechanisms for instances where a user's voice is improperly rejected due to changes in the user's voice because of a cold or a poor phone connection.

A personal IMR application 202 enables an authorized user to configure a customized interactive multimedia response system that is unique to the user's phone (or any other end-terminal suitable for receiving calls) It is noted that in the context of the disclosed and claimed invention, a "call" generally encompasses an event involving one entity (e.g., person) initiating contact with another entity (e.g., person) without regard to a particular mode of communication. Examples of various call types include: voice calls, e-mail, or instant messages executed using a variety of computers/appliances. In known phone systems, a single voice response system definition (a set of response rules) is applied to an ACD (automated call distributor) or to the company's head number to route voice telephone calls to specific numbers or a queue. In contrast, in accordance with an embodiment of the present invention, a database within the network interface/server 114 supports a distinct IMR configuration for each phone or other callable end-terminal in a PBX system (including converged networks). Other callable end-terminals include by way of example IP phones and applications within networked computers.

In addition to individual custom configuration, another feature of the personal IMR application 202 is the flexible/extensible multimedia nature of the personal IMR application 202. The personal IMR application 202 receives communications, including phone calls and electronic messages (e.g., email), in a variety of formats and routes the communications to a variety of destinations according to a set of rules defined for the particular recipient of the communications. A rules engine attempts to establish communication between the two users via the best method available. For example Person A calls Person B. Person B has set the find me status to out of the office. Person B's out-of-the-office device is a two-way pager capable of receiving pages, e-mail, and instant messages. The IMR system attempts to determine the capabilities of Person A's terminal either through querying the device directly or asking the user interactively through an interactive voice response menu. For example if Person A's terminal (a phone) is a phone capable of sending instant messages, the IMR will establish an instant messaging (IM) session between the two users. If Person A's terminal is not capable of sending e-mail or an instant message, the IMR will allow Person A to send a numeric page to Person B.

Furthermore, the personal IMR application 202 incorporates access to databases tied to other applications. One configurable feature is a "find me" function that determines a likely present location(s) of the call recipient by accessing information stored in a personal database file such as a personal planner or appointment calendar. Rather than route the call to ordinary voice mail (thus initiating a phone tag sequence), the call is redirected, if designated to do so by the recipient, to the likely present location or locations, simultaneously or serially, at which the call recipient can be reached (e.g., a cell phone number). The form of the forwarded call is not confined to a voice phone call. As will be demonstrated by an example below, the personal IMR application 202 also forwards calls to the recipient in the form of text messages.

In an exemplary configured response scenario the personal IMR application 202 is programmed to route a received instant message to a cell phone or a beeper that accepts text messages, two way pages, or instant messages. In response to the instant message sent to the personal IMR application, the personal IMR determines, by referring to a user status variable and/or a set of configured rules for the recipient, that the intended recipient is likely on a particular cell phone that accepts text messages. The IMR application issues a response to the sender of the instant message informing the sender that the recipient is out of the office. The response further invites the sender to transmit a message to the recipient's cell phone with the following format: "cell phone: message". The personal IMR system also notifies the sender of any particular restrictions on messages to the cell phone. For example, the IMR application 202 may inform the sender that messages to the recipient's cell phone are limited to 125 characters, and that the recipient's receiving device cannot send replies. The personal IMR stores a subsequently received text message in a personal message storage space for the recipient. After retrieving the message, the recipient may issue a response in the format of "Message: message". In other words, a Message type designation followed by the message text. The personal IMR application 202 provides a number of advantages over known interactive voice response systems. The potential modes of access to the IMR application 120 are expanded because the personal IMR application 202 supports both voice and electronic data access. Furthermore, the breadth of potential responses is expanded to include electronic data message responses such as instant messaging and email in addition to the traditional voice mail and call forwarding capabilities of known PBXs. Moreover, the personal IMR application 202 accesses databases to determine the status of the recipient and select a proper response based upon applying the status information to a configured set of rules. Finally, the personal IMR application 202 is defined for individual recipients, thereby enabling customized response schemes to be defined for each recipient. By way of example, in one configuration of the personal IMR application 202, a user browsing on a web page could cause a "call" to be placed in the sales queue by a personal IMR of the call recipient. When a sales agent becomes available they will place a "call" to the user. The call may be in the form of email, instant message, a phone call, an Internet Protocol phone call, etc. The structure of the personal IMR application 202 is discussed further herein below in conjunction with FIGS. 5 and 6.

A distributed conference bridge application 204 performs automatic set-up of a phone conference that may include either of both internal and external conference bridge hardware. The participants in the phone conference are connected according to a conference call connection arrangement defined by a user. Through a configuration editor interface, the user specifies a threshold value, including zero, for the number of conference participants to be connected into the phone conference via an internal conference bridge (typically integrated into a PBX system). A configuration editor component of the distributed conference bridge application 204 may incorporate the terminal abstraction architecture described herein above. Such a configuration editor supports user specification of distributed conference bridge parameter values via graphical and voice user interfaces.

After the connection scheme has been defined, the distributed conference bridge application 204 controls the set-up of the conference call connections. Under the direction of the distributed conference bridge application 204, conference participants are connected to the internal conference bridge until the number of connections corresponds to the threshold value for internal conference bridge connections. Thereafter, the distributed conference bridge application 204 signals the central office controlling a first head end telephone number for the customer's conference bridge to redirect callers to a second head end telephone number corresponding to the external conference bridge. The signal to redirect calls to the external conference bridge is provided in the form of PINT, QSIG, or in-band remote call forwarding, all of which are well known signals to those skilled in the art.

An advantage of the above described re-direction capability is the simplicity with which the distributed conference bridge, including both an internal (PBX integrated) conference bridge and an external conference bridge, is assembled. Only a single conference call need be identified to the participants. In the case where participants call in, all participants use a same call-in number. With regard to the participants that are connected to the external conference bridge after the internal bridge reaches its designated capacity, the participants are unaware that their call was redirected. There is no change in participants' procedure or a reduction of features from users that are connected to internal conference bridge.

One embodiment of a distributed conference bridge includes a conference call involving calls over ordinary phone lines such as for example PBX and PSTN lines. However, the conference bridge connection operations and mechanisms described above are not limited to such networks. Rather they are also applicable to conference calls over virtually any public or private network. Finally, incorporating the terminal abstraction architecture to the call connections enables the creation of a hybrid conference call arrangement including, for example callers connected through private phone networks, a PSTN and/or the Internet.

An instant messaging application 206 treats an instant message the same as a phone call. The external interface and operation of instant messaging remains the same as known instant messaging services. A user via the network interface/server 114 registers with an instant message server (e.g., MICROSOFT NETWORK). In accordance with an aspect of the particular implementation of the convergence paradigm in the present electronic personal assistant, all messages are transformed into message abstractions that are treated equally, to the extent possible, regardless of the end-terminal that issued the message. Thus, email, voicemail, instant messages, etc. can be accessed by a recipient by phone or computer interface.

However, this does not mean that the type of end-terminal is irrelevant to the instant messaging application 206. The terminal abstraction renders a generic message, and the rules engine applies a criterion for handling the generic message. The call type is taken into account when routing. For example an instant message would never be routed to a telephone headset unless the text message has been converted to audible speech or the telephone was equipped with a text data display. With regard to the instant messaging application, the instant message can be forwarded to voice mail, an instant message enabled destination phone, etc. Instant messaging forwarding could use the IMR to forward the message or have it's own forwarding mechanism.

A Call Announcement application 208 provides both audible (PC chime or utilizing TTS speaks the callers name) and/or visual call announcements through a call recipient's personal computer. The Call Announcement application 208 also enables the call recipient to issue commands to control acceptance or rerouting of a received call via graphical and/or voice user interface commands. The Call Announcement application 208 receives caller identification information associated with an incoming call. Thereafter, the call announcement application 208 references a rules database to determine any particular customized announcement features to apply to the call. An example of a customized announcement feature is immediate forwarding of calls to voice mail. Another example, in an environment adopting the terminal abstraction architecture, is converting a voice mail message to text and storing the message in email. The call announcement application 208 thereafter carries out the call announcement.

The set of applications 188 is extensible both horizontally (new independent applications) and vertically (leveraging existing voice/phone accessed applications). Thus, any number of additional voice applications may be added to the set of voice applications 188.

Other applications are also included within the extensible set of applications 188, but not specifically identified in FIG. 4. The applications described below provide multiple modes of access by incorporating the terminal abstraction architecture. Also, the multi-access mode capability facilitates integrating the described applications with other base applications such as email, databases, and Web browsers to enhance utility of those applications.

A workgroup monitoring application enables authorized users to monitor the status of a workgroup member's phone line to determine the line status and other call information, including a caller identity and degree of importance of the call. Access to monitor a particular line is controlled through security. For example a secretary could monitor the phone of another employee for whom the secretary provides assistance. The secretary's workgroup monitoring application would likely not be allowed to monitor the phone of another employee for whom she provides no assistance. The workgroup monitoring application includes voice access mode access to enable a workgroup member to monitor a line from out of the office at a public phone and issue a message (e.g., via urgent email dictated and sent via vocal commands from a phone) to a particular recipient to get off the phone to free the line for another important call.

Another voice application is voice activated dialing (Intelligent Dial Tone) that not only initiates dialing a phone number but also carries out particular types of phone calls such as conference calls based upon verbal commands. An Internet/intranet integration application responds to verbal commands while performing a voice-based task such as replaying email, accessing information from a central database, files on a network share, sending a document to a fax recipient, by launching a browser and retrieving and reading back (email or fax) information accessed via the voice commands.

Enhanced Contact Controls are yet another application that may exploit the terminal abstraction architecture presented herein. Enhanced Contact Control enables scheduled tasks to be automatically activated, and a user is prompted to initiate a call via voice commands rendered directly to a phone integrated within the computer. The call can alternatively be initiated by a sequence of clicks and drag/drop acts by a user at the computer. The Enhanced Contact Control application may also incorporate priority rules etc. when executing scheduled tasks.

VUI Personal Information Manager applications enable a user to access contact information from a remote location by vocal commands to databases maintained within the control of the network interface/server 114 and to take appropriate actions including dialing a client's telephone number that was retrieved by the PIM. This application integrates a number of previously discussed features and applications supported by the electronic personal assistant including the voice print application 200, TTS, STT, and the voice activated dialing application.

Figure 5:
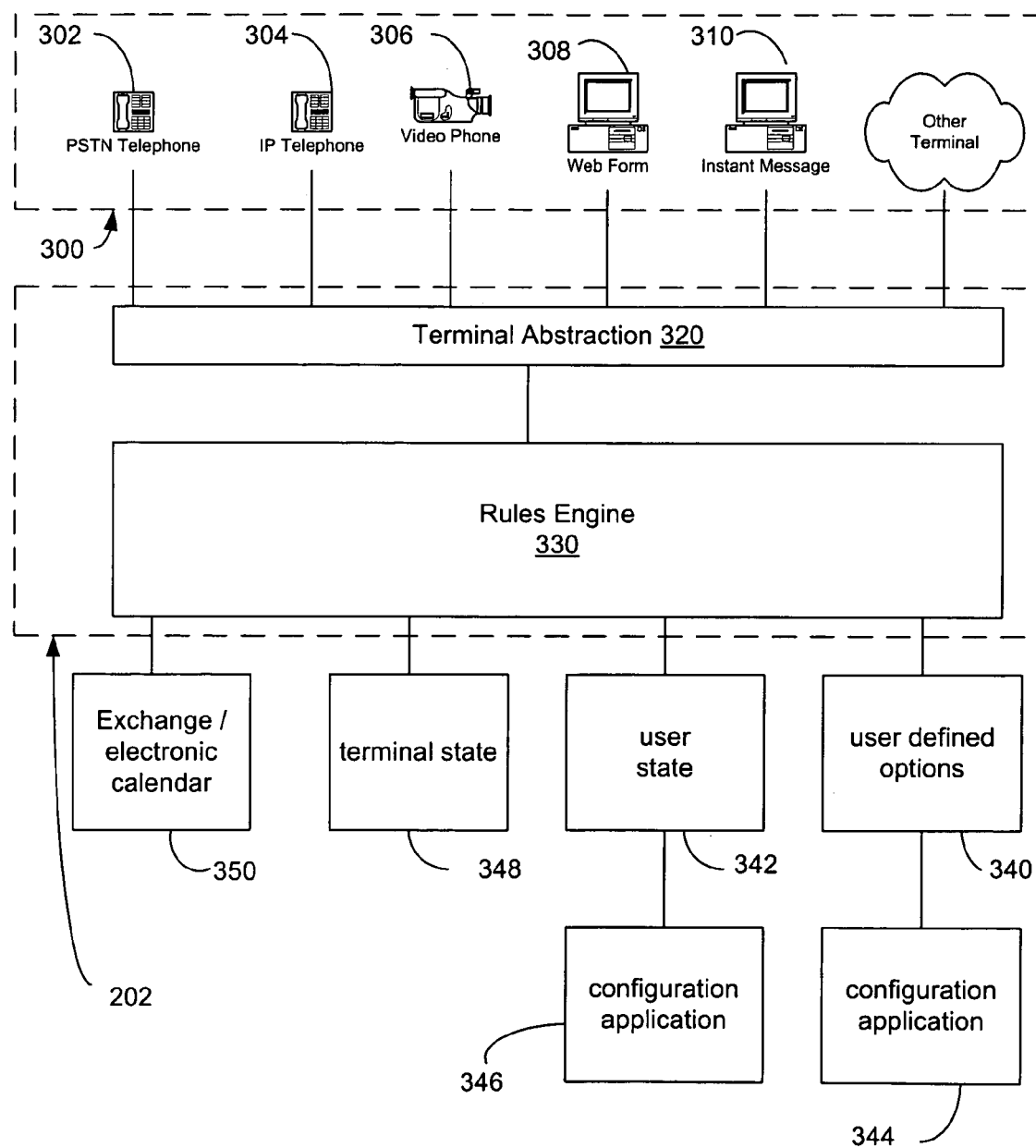
FIG. 5 is a block diagram depicting the components of a personal interactive multimedia application.

Turning now to FIG. 5, an exemplary application program architecture is provided to illustrate the general functional parts of the terminal abstraction architecture facilitating multiple modes of access by users to applications and their associated resources through a communications server such as the network interface/server 114. The personal IMR application 202 provides user configured responses to callers that utilize a variety of access modes to contact a particular recipient. A set of access modes 300 includes a public switched telephone network (PSTN) telephone 302, an Internet Protocol (IP) telephone 304, a videoconference phone 306, a web form 308 via a personal computer and an instant message 310 via a personal computer. The set of different access modes depicted in FIG. 5 is exemplary and thus there is no intention to limit the scope of the terminal abstraction to handling sessions involving the specifically identified access modes. Rather the set of modes is preferably extensible. Additional modes of access are incorporated into the terminal abstraction software of the application (or operating system) software.

In an embodiment of the terminal abstraction architecture, the IMR application 202 comprises two functional components, a terminal abstraction component 320 and a rules engine component 330. The terminal abstraction component communicates, on behalf of the IMR application 202, with the end terminals. Differences between modes of access are handled primarily by the terminal abstraction component 320. The terminal abstraction tailors functionality provided by the IMR application 202 (including the interface specification) to a specific mode of access. For example, the terminal abstraction component 320 tailors interaction with the PSTN telephone 302 and IP telephone 304 to voice user interface. In contrast, the terminal abstraction component 320 tailors interaction with the Web form 308 and Instant Message 310 modes of access to a text or graphical user interface.

The method of communication between the terminal abstraction component 320 and functional components of the IMR application 202, such as a rules engine component 330, is the same without regard to the mode of access. Thus, the functional components of the IMR application 202 are not directly exposed to, and need not consider, the particular one of the set of modes of access 300 to a call recipient. The terminal abstraction component 320 tailors a generalized call response, formulated by a rules engine 330, to a particular mode of access used to call the recipient.

The rules engine component 330 comprises a framework for applying a set of response rules applicable to all types of calls regardless of the mode of access to a particular recipient. The rules engine component of the IMR application 208 applies a defined criterion to a set of status and data values pertaining to a particular call recipient. The rules engine formulates a response. The generalized response is then provided to the terminal abstraction. Because the terminal abstraction component 320 of the personal IMR application 202 handles communication and interface differences between various modes of access, the rules engine component 330 need not consider the mode of access utilized by a caller when formulating a response. This does not preclude, a user from specifying a particular type of response based upon the mode of access by a caller and the rules engine applying that rule to formulate a response.

A portion of the parameters potentially accessed by the rules engine component 330 are designated via user configuration interfaces. A set of user defined options 340 specify a user customizable set of response options that are applied by the rules engine component 330 to formulate a call response. A user state 342 specifies the status of a call recipient. For example the recipient may be in/out of the office, on the phone, in a meeting, etc. Both the user defined options 340 and user state 342 are set via configuration applications 344 and 346. The configuration applications 344 and 346 need not be applets that are integrated into the personal IMR application. Rather, the configuration applications 344 and 346 may be a web browser, a text editor, a voice-based user configuration interface, etc. Multiple modes of access are supported enabling configuration from a number of different end-terminal types.

The rules engine component 330 consults automatically set values to formulate a response. For example a terminal state 348 may be accessed. The terminal state 348 may include whether a computer terminal is on, being used, is on standby/screen saver mode. The terminal state 348 may include whether the phone is off-hook or the do not disturb feature has been activated in order to formulate a response.

The rules engine component 330 also consults parameter values that are independently set by other applications, but are accessible to the rules engine component 330. For example, the rules engine component may consult a calendar 350 maintained by the call recipient to determine a probable location of the call recipient. Other potential databases may also be accessed to render information used by the rules engine component 330 to formulate a response.

Figure 6:
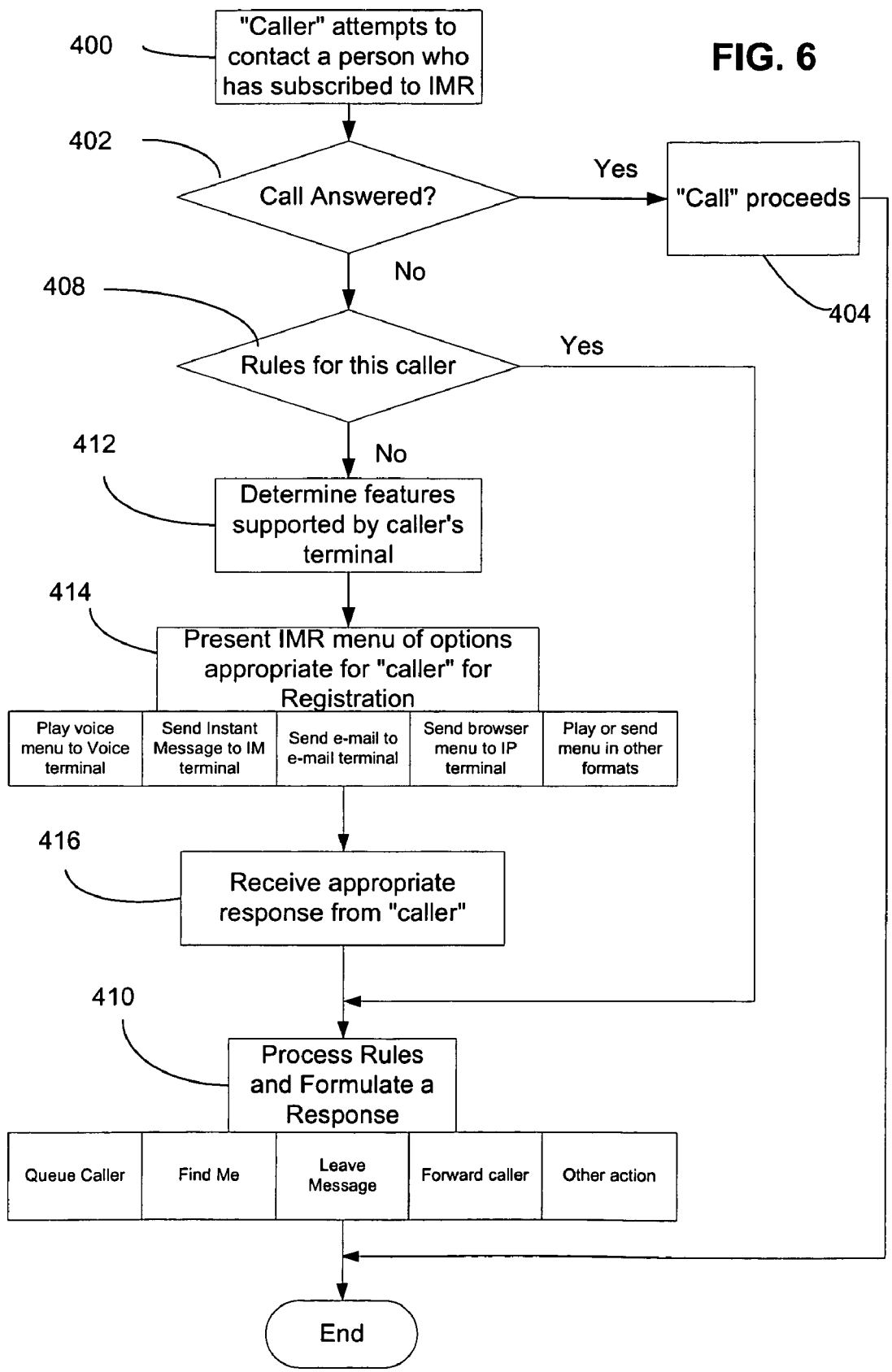
FIG. 6 is a flowchart summarizing the steps of a personal IMR application.

Having described the components of the personal IMR application 202, attention is directed to FIG. 6 showing the steps performed in response to a received call to a recipient with an activated personal IMR application 202. During step 400 a call is received by the personal IMR for a particular caller. In response, during step 402 if the call (which may be a regular call, an email message, a web form, a fax, an instant message, etc.) is answered, then control passes to step 404 and the call proceeds as normal. That is, response mechanisms of the personal IMR are not invoked. Control then passes to the End 406 which corresponds to the end of a call.

If the call is not answered by the call recipient during step 402, then control passes to step 408. At step 408 the IMR application 202 determines the identity of the caller and whether response rules exist for the caller and the current mode of access used by the caller to reach the recipient. If a set of rules have been established for the identified caller and the identified mode of access, then control passes to step 410 wherein the rules engine component 330 processes the call in accordance with a configured response options (specified for both the caller and the recipient) and the present status and data values for the call recipient. The media or manner in which the response is provided is not limited to voice response. Rather the response may take the form of a call queue wherein the caller placed behind other callers who are on hold. The response may be activation of a find me application which seeks to track down the intended call recipient by referencing a calendar or day planner database, or by forwarding the call to a number specified by the recipient. The response may request the caller to leave a message—which could be placed in a voice mailbox, email box or an instant message for the recipient. The responses are not limited to the above identified response types, rather the responses are intended to be an extensible set that are added in accordance with new modes of access and channels by which a recipient can request further actions by the caller when the recipient is unavailable or unable to take a call. Control then passes from step 410 to the End 406.

If during step 408 a set of rules cannot be identified for the particular caller, then control passes to step 412. At step 412 the capabilities of the caller's terminal are determined. Step 412 involves gaining sufficient information about the caller's mode of access to select a proper interface and options to be implemented by the terminal abstraction component 320 of the personal IMR application 202.

After determining the traits of the caller's mode of access, control passes to step 414 wherein the caller is presented a menu comprising a set of IMR actions. The user interface of the menu is tailored by the personal IMR application 202 to the caller's mode of access and carried out by the terminal abstraction component 320 according to the caller's mode of access.

The caller may select from the menu an option to play a voice menu for a voice access terminal. Another selection is to allow the caller to send an instant message to the terminal of the call recipient—based for example on the determination by the personal IMR application 202 that the recipient's terminal is on. The caller is presented the opportunity to send an email message to the email box associated with the call recipient. Yet another exemplary response is sending a browser menu in the event that the caller terminal is an Internet Protocol terminal. The set of multimedia options presented to a caller by the personal IMR application 202 is by no means limited to the above examples. The potential selections in the menu of options selectable by the caller include playing or sending menus to presenting options to callers according to the mode of access used by the caller to contact the call recipient.

At step 416, the personal IMR application 202 receives a response from the caller based upon the set of options provided to the caller during step 414. Control then passes to step 410, described previously above, wherein the caller selection is processed by the rules engine component 330 based upon the configured response and the status and data parameters for the call recipient. Control then passes to the End 406. It should be understood that the above described sequence of steps performed by a personal IMR application are illustrative, and that those skilled in the art will recognize that the personal IMR application can be performed in a multitude of ways.

Figure 7:
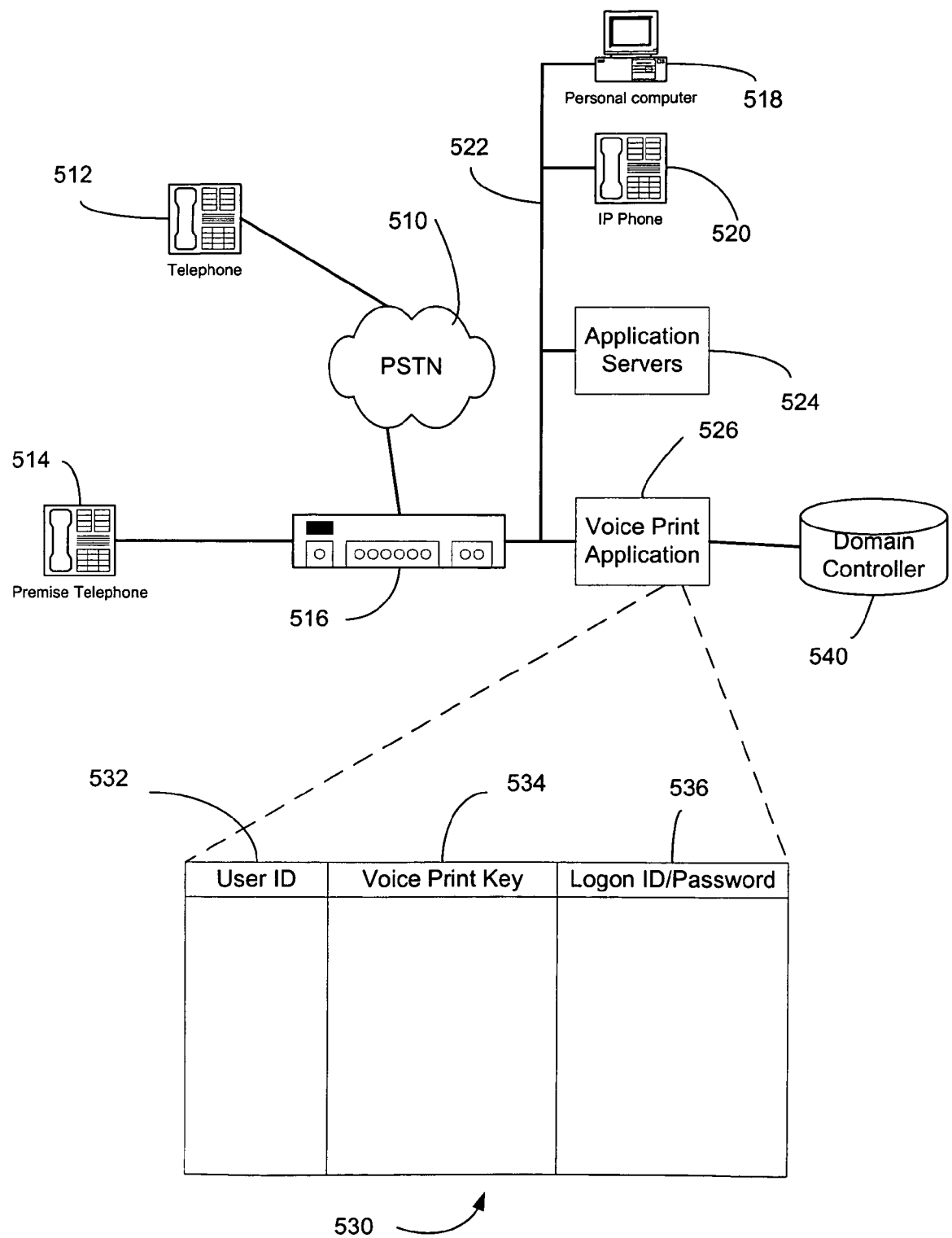
FIG. 7 is a schematic diagram depicting components within a converged computer system for facilitating voice-based authentication of a user.
Figure 8:
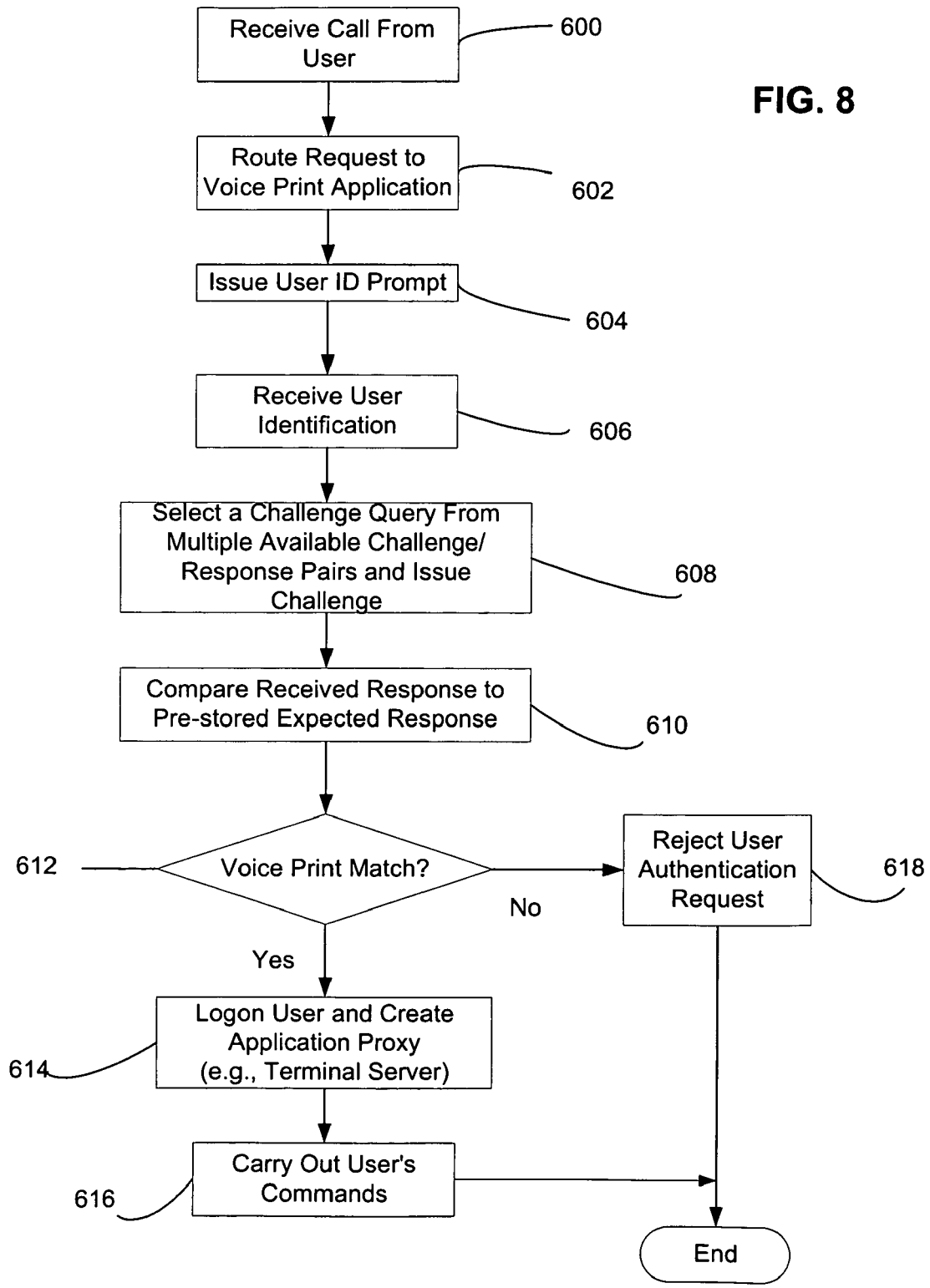
FIG. 8 summarizes the steps performed by an interface server/controller in accordance with a voice print application to determine whether to grant access to network resources to which access is selectively provided to authenticated authorized users.

Having described a set of voice applications accessed via the network interface/server 114 (or any other suitable communications server) and having further described an example of the terminal abstraction architecture in the form of a personal IMR application 202, attention is now directed to FIGS. 7 and 8 depicting and summarizing the voice print application 200. A public switched telephone network 510 (or other suitable network) connects users having access to any phone such as phone 512 to a network communications server 516. A user may alternatively call into the network communications server 516 via a premise telephone 514 that is directly connected to the network communications server 516 as shown in FIG. 7 (in the event that a PBX hub is built into the network communications server 516). In other embodiments, a PBX hub is interposed between the premise telephone 514 and the network communications server 516. The type of end terminal need not be limited to the above described phones. Rather, the "phone" may comprise, by way of example, a microphone equipped personal computer 518 or an Internet Protocol phone 520 connected to the network communications server 516 via a LAN link 522. The communications server 516 includes a number of applications such as the aforementioned applications 188. LAN link 522 also supports connections to other applications servers 524.

The network communications server 516 executes a voice print application 526 including a voice print authentication database 530. The voice print authentication database 530 includes multiple entries corresponding to each of the authorized users of the system. An identification field 532 within each user entry comprises a unique user identification. The unique user identification is used to reference a proper voice print challenge and pre-stored expected response from the user.

A voice print key field 534 stores multiple challenge/response pairs for each user. During a user voice logon, one or more of the challenge/response pairs are variably selected (e.g., randomly/pseudo-randomly from a set) to facilitate authenticating the user. A user identification/password field 536 includes the alphanumeric sequences for logging a user onto the system (e.g., a network domain, a specific application, etc.). The information within the user identification/password field 536 is sensitive in nature and must be secure both within the database 530 and when transmitted to a domain controller 540 during logon.

It is noted that while not specifically identified in the drawings, the voice print authentication database 530 includes a file of queries enabling the computer network data interface/server 216 to transmit challenge queries to an identified user in order to prompt a response. In cases where a large quantity of potential questions are stored, the questions themselves can be stored as text. The text of a query is retrieved and converted to speech by a TTS converter. The query is not to be confused with the expected response(s) that are stored as a digital file representing a vocal recording of the speaker during a learning phase.

As previously mentioned, the queries are such that a variable response is required. The query itself need not be variable. For example, the question may request the user to repeat a present date and time furnished by the voice print application. In another example of a variable response, the questions themselves are indeed variable between logon attempts. The contents of the identification field 532 and the identification/password field 536 are used to log an authenticated user onto the system via a standard Windows challenge response mechanism utilizing the domain controller 540.

Turning now to FIG. 8, an exemplary set of steps are depicted for invoking and executing a user logon procedure that compares a user's vocal query response to one or more stored voice samples corresponding to an expected response to authenticate an authorized user. In a secure system, the comparison and successful match of a response to a pre-stored sample is a precondition to granting access to the data and other resources available to the user via the communications server 516. Thus, in response to receiving a call during step 600 from a user requesting authentication, control passes to step 602 wherein the communications server 516 routes the request to the voice applications 188, and more particularly the voice print application 200.

At step 604, the voice print application 200 invokes operations within the communications server 516 to issue a prompt (preferably audible, but may be text in the case of text interfaces available on personal computers and some phones today) to the user to submit a user identification. Next, during step 606 the communications server 516 receives the user's identification. The user identification may be in the form of a sequence of touch tones or alternatively spoken words. The response is converted to an alphanumeric sequence that is then used to access an entry corresponding to the user within the voice print authentication database 530. Assuming a corresponding entry is located within the database 530, control passes to step 608.

At step 608, the voice print application 200 variably selects a challenge query from the corresponding voice print key field 534. The form of the query may be a request to repeat a word, phrase, or sequence of numbers. For example, the voice print application 200 selects a request out of a pool of potential requests and couples the query with a request for the speaker to speak today's date (e.g. "Please say Seattle and today's date"). In this particular example, it is reasonably assured that the combination of words and phrases in the response will be unique every time an authorized user logs onto the system. An important factor in the variable logon request scheme is that there is a low likelihood that a particular request will be repeated by the voice print application 200. Thus the voice print application provides assurance that expected user responses will be unique and reduces the system's vulnerability to imposter attacks. Alternatively the query may comprise one or more questions from a set of personal questions answered by the user during a secure registration process. The query is transmitted to the user by the communications server 516.

Next, during step 610, the communications server 516 receives the identified user's audible response, and the response is forwarded to the voice print application 200. The voice print application 200 compares the user's response to a pre-stored reference response (or set of responses). At step 612, if the user's response comes within an acceptable range of similarity to the pre-stored reference response, then the identified user is considered authentic by the voice print application 200 and control passes to step 614.

At step 614 the voice print application 200 creates a virtual user desktop for the authenticated user and logs into the domain with the cached user credentials that are stored in the voice print application 200. A MICROSOFT TERMINAL SERVER could be used for the virtual desktop and operate on behalf of the user. The voice print application 200 retrieves the contents of the network identification/password field 536 from the voice print authentication database 530 and a logon proxy submits a logon request via a password notification message to the connected domain controller 540. Thereafter, the voice print application 200 creates an application proxy that holds the credentials for the authenticated user. In a network environment, the application proxy would have all the credentials of the user as if the user had logged in locally via a personal computer or remotely over a remote access server (RAS).

During step 616, the application proxy created during step 614 carries out requests received from the authenticated user. The user requests may be either vocal or electronically generated (e.g., touch tone). Examples of network resources that may be directly accessed by the application proxy include: email requests that are accessed and read back to the authenticated user; a personal IMR editor (e.g., change a forwarding number); Internet sites that are accessed, for example, via an Web telephony engine; and a database that is selectively accessed according to the authenticated user's credentials assigned during the logon step 614. The application proxy created by the voice print application 200 may interact with other applications that in turn access computer resources. The application proxy could also utilize Microsoft's accessibility features and allow a user to fully interact with the terminal server virtual desktop and applications similar to how a sight-impaired user interacts with a PC monitor. When a user hangs up the phone, the session is terminated and control passes to the End.

If at step 612, the voice print application 200 determines that the user's audible response is not sufficiently similar to the pre-stored reference response (or responses), then control passes to step 618 wherein the voice print application rejects the user logon request and control passes to the End. However, in an alternative embodiment of the present invention, the user may be allowed multiple tries to logon, in such a case an event log will tally an unsuccessful logon attempt by a user during step 618 and return to step 308 (or a variation thereof where the user is merely asked to repeat a previous response). The voice print application will repeat the query/response cycle until the number of successive failures reaches a limit and then control passes to the End.

Those skilled in the art will appreciate that there are numerous ways to gauge whether a match of a response and a pre-stored sample has occurred, and various the challenge/response/match cycle may be repeated multiple times to ensure that a user is authentic—even in instances where a match has occurred. Therefore, there is no intention to limit the present invention to the illustrative challenge/response/match sequence depicted in FIG. 8.

Figure 9:
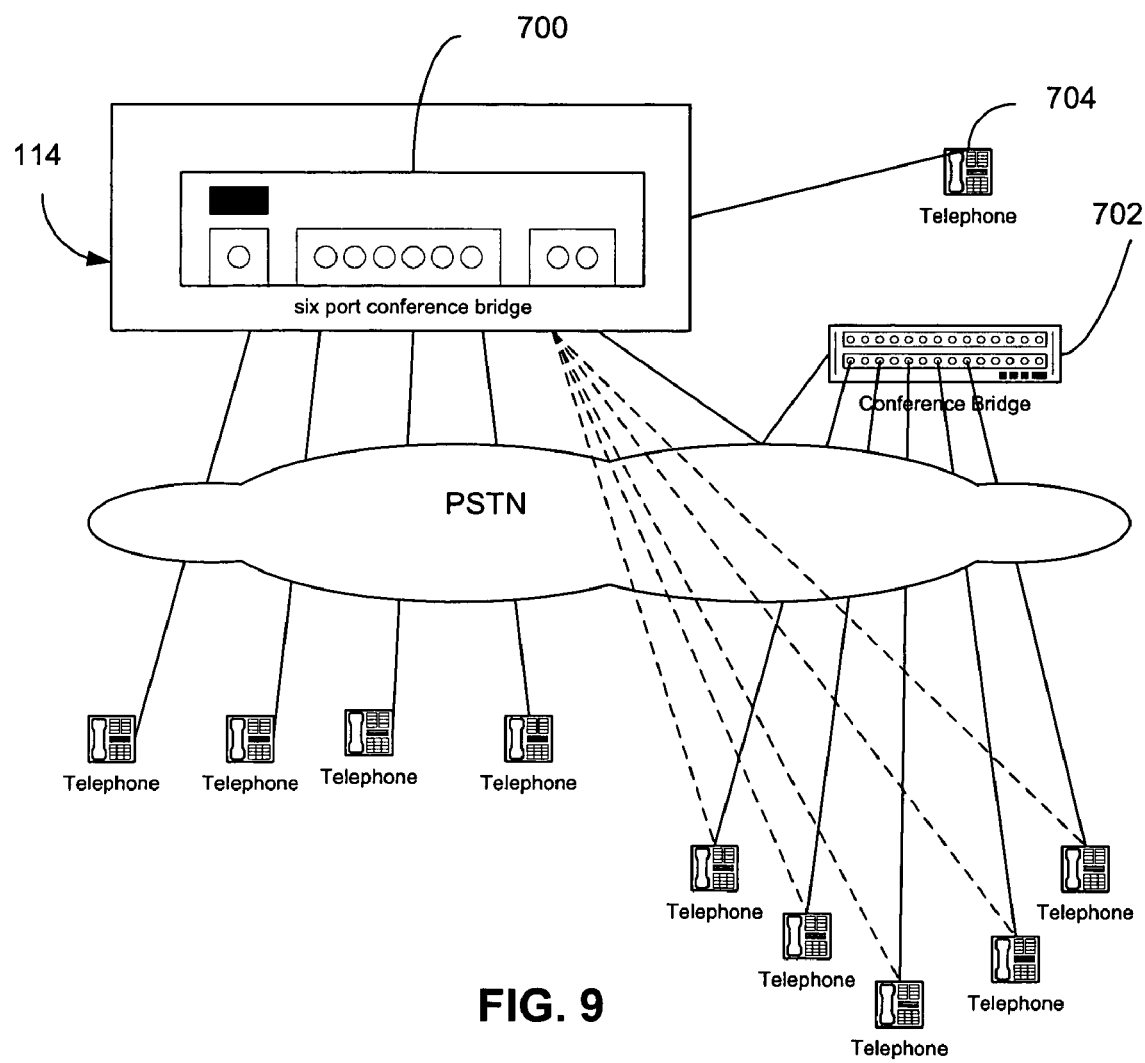
FIG. 9 is a schematic depiction of a distributed conference bridge.
Figure 10:
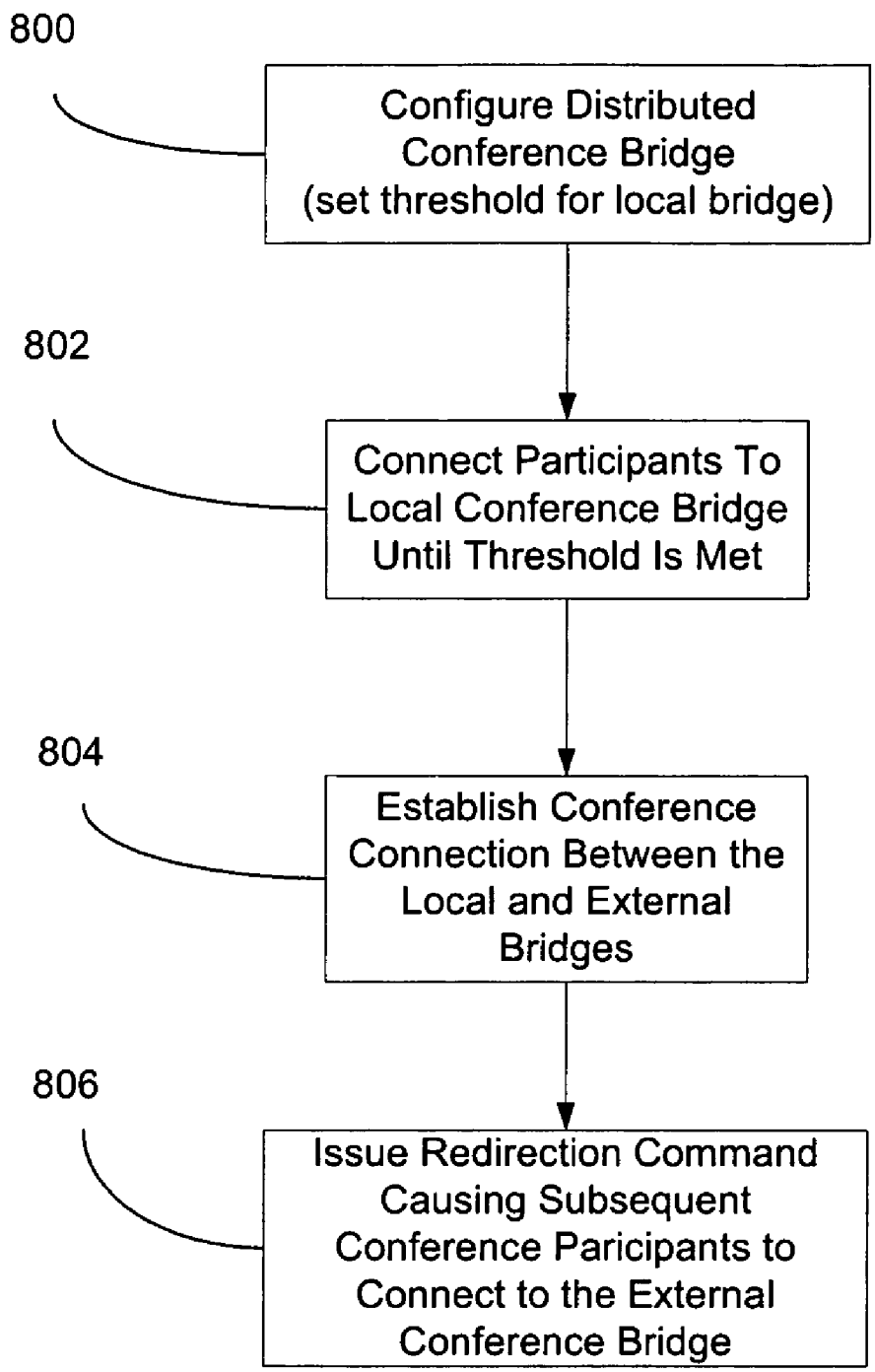
FIG. 10 is a flowchart summarizing the steps performed to create a distributed conference bridge.

Having described the voice print application 200, attention is now directed to the previously mentioned distributed conference bridge application 204 with reference to FIGS. 9 and 10. FIG. 9 provides an exemplary conference call arrangement wherein part of a distributed conference bridge arrangement comprising 10 trunk lines is handled by an internal conference bridge 700 within the network interface/server 114. The PBX system within the network interface/server 114 handles more than the ten trunk lines needed for the conference. However, the internal conference bridge 700 can only connect six callers for a conference involving ten different lines. Therefore, the remaining participants are connected to an external conference bridge 702. A conference connection 710 between the internal conference bridge 700 and the external conference bridge 702 merges the two conference bridges into a single, distributed conference bridge. The conference call includes callers attached via the PSTN as well as locally connected phones within the PBX such as phone 704.

The dotted connection lines in FIG. 9 illustratively depict that even though the actual connection of a portion of the participants to the conference occurs through the external bridge 702, this connection is transparent to the participants. All conference participants follow procedures for connecting to the internal conference bridge 700. The system handles re-direction of calls to the connected external bridge 702. The example in FIG. 9 includes only telephone end points. However, it is noted that the method and apparatus for building and controlling a distributed conference bridge, described below with reference to FIG. 10 is applicable to Internet Protocol terminals (e.g., in a Net Meeting application), video conferences, and wireless end-terminals—even hybrid conference call arrangements.

Turning to FIG. 10, the steps are summarized for setting up a distributed conference bridge including both an internal conference bridge and external conference bridge as depicted in FIG. 9. Prior to commencing set up of a conference call, during step 800 the network interface/server 114 is configured. Assignment of lines to the internal conference bridge during configuration is accomplished via a graphical or voice user interface presented to the arranger of the conference call via a logged on computer or other end-terminal or rules logic assigned to the conference bridge application. The set up interface is tailored by a terminal abstraction module of the distributed conference bridge application based upon the type of terminal used to perform the configuration. During the configuration a threshold is specified. The threshold corresponds to the maximum number of lines (including a value of zero) that can be connected into the internal conference bridge 700 when the conference call is set up. Configuration also includes designating the total number of callers expected to participate in the call. An external conference bridge service is notified of the need for external conference bridge resources.

After configuring the distributed conference bridge, decision-making and call routing processes executed by the distributed conference bridge application 204 carry out automated assembly/set-up of a phone conference. The phone conference includes both an internal conference bridge associated with the PBX system of the user and an external conference bridge provided by an outside phone services vendor. In particular, during step 802 the network interface/server 114 connects callers into the internal conference bridge 700 until the threshold has been reached. In particular, during step 802 the network interface/server 114 determines whether the threshold has been reached. If the threshold has not been reached, then a next caller is connected to the internal conference bridge 700. If the threshold has been reached, then control passes to step 804 wherein one of the bridge connections of the internal conference bridge 700 is used to automatically establish a conference linkage to the external conference bridge utilizing automatic dialing functions supported by the network interface/server 114. The connection between the internal bridge 700 and the external bridge 702 is established through QSIG, PINT, in band signaling, or data exchange across the Internet between two conference bridge servers. Control then passes to step 806.

At step 806, the network interface/server 114, under the control of the distributed conference bridge application 204, automatically signals the central office controlling the head end telephone number for the customer's conference bridge using the PINT, QSIG, or in-band Remote Call Forwarding to redirect callers to a head end telephone number corresponding to the bridged conference bridge. The remaining callers are connected to the external conference bridge 702 without their calls ever reaching the PBX supporting the internal conference bridge 700. By intercepting the calls at the central office and forwarding them to the external conference bridge, the distributed conference bridge application prevents calls by the externally connected participants from tying up trunk lines to a PBX system supporting the internal portion of the phone conference. Participants in the conference are unaware that their call was redirected. There is no change in end user's procedure to connect to the external conference bridge 702 or reduction of features from users that connected to the customer's conference bridge. The conference call continues to completion.

Illustrative embodiments of the present invention and certain variations thereof have been provided in the Figures and accompanying written description. Those skilled in the art will readily appreciate from the above disclosure that many variations to the disclosed embodiment are possible including for example using alternative program and data structures. For example, while a particular arrangement of processes is presented in FIG. 3 for implementing a computer network data interface/server (or more generally, a communications server), other arrangements may be used without deviating from the invention. Also, the order of performing the disclosed steps is subject to modification without departing from the scope of the present invention. The manner in which the general steps themselves are carried out may be modified in alternative embodiments of the invention. The present invention is not intended to be limited to the specifically disclosed exemplary embodiments. Rather the present invention is intended to cover the disclosed embodiments as well as others falling within the scope and spirit of the invention to the fullest extent permitted in view of this disclosure and the inventions defined by the claims herein below.

What is claimed is:

1. A method for providing a dynamically configurable distributed conference bridge for use in a conference call for a set of differing end devices utilizing differing user interfaces, the conference call having a call-in phone number handled by a central office of a public switched telephone network (PSTN), the method comprising:
- configuring an internal conference bridge comprising specifying a threshold corresponding to a maximum number of callers to be connected to the internal conference bridge;
- connecting one or more callers to the internal conference bridge until the threshold has been reached; and
- once the threshold has been reached, automatically establishing a linkage from the internal conference bridge to an external conference bridge and automatically redirecting additional callers to the internal conference bridge exceeding the threshold to be connected to the external conference bridge through the linkage, wherein the callers connected to the internal conference bridge and the callers connected to the external conference bridge have access to identical conference call features, and wherein the automatically redirecting comprises signalling the PSTN central office to redirect callers to the call-in phone number to the external conference bridge, after which the PSTN central office redirects callers such that the redirected callers bypass a PBX handling callers using the internal conference bridge.

2. The method of claim 1, wherein the callers connected to the internal conference bridge and the callers connected to the external conference bridge use a same call-in number in order to participate in the conference call, wherein the call-in number is a first head end telephone number.

3. The method of claim 1, wherein the set of differing end devices comprises devices utilizing at least one of a private telephone network, a public switched telephone network, LAN, WAN, and the Internet.

4. The method of claim 1, wherein the internal conference bridge is integrated into a private branch exchange system.

5. The method of claim 1, wherein the additional callers are connected to the external conference bridge while being unaware of the redirecting.

6. The method of claim 1, wherein configuring the internal conference bridge comprises designating an estimated total number of callers expected to participate in the conference call.

7. The method of claim 6, further comprising notifying the external conference bridge service of the need for the external conference bridge if the estimated total number of callers exceeds the threshold.

8. The method of claim 1, wherein automatically establishing the linkage includes using an automatic dialing function.

9. A system for providing a dynamically configurable distributed conference bridge for use in a conference call for a set of differing end devices utilizing differing user interfaces, the system comprising:
- an internal conference bridge including a first set of a plurality of ports;
- an external conference bridge including a second set of a plurality of ports; and
- a linkage from the internal conference bridge to the external conference bridge, wherein additional callers to the internal conference bridge exceeding a threshold corresponding to a maximum number of callers to be connected to the internal conference bridge are automatically redirected from the internal conference bridge to be connected to the external conference bridge over the linkage, wherein callers connected to the internal conference bridge and callers connected to the external conference bridge have access to identical conference call features, wherein the automatic redirecting is performed by transmitting a signal to a PSTN central office and after the signalling the PSTN central office causes calls to a number handled at the PSTN central office and corresponding to exceeding the threshold to be redirected to the external conference bridge, such that the redirected callers bypass a PBX handling callers using the internal conference bridge.

10. The system of claim 9, wherein the internal conference bridge corresponds to a first head end telephone number and the external conference bridge corresponds to a second head end telephone number different from the first head end telephone number, wherein the additional callers are automatically redirected from the first head end telephone number to the second head end telephone number.

11. The system of claim 10, wherein the callers connected to the internal conference bridge and the callers connected to the external conference bridge use a same call-in number in order to participate in the conference call, wherein the call-in number is the first head end telephone number.

12. The system of claim 9, wherein the set of differing end devices comprises devices utilizing at least one of a private telephone network, a public switched telephone network, LAN, WAN, and the Internet.

13. The system of claim 9, wherein the internal conference bridge is integrated into a private branch exchange system.

14. The system of claim 9, wherein the additional callers are connected to the external conference bridge while being unaware of the redirection.

\* \* \* \* \*